United States Patent [19] [11] 4,052,700

Soobik et al. [45] Oct. 4, 1977

[54] REMOTE CONTROL RECEIVER

[75] Inventors: Lembit Soobik, Kranzberg, Germany; Horst Leuschner, Dallas, Tex.

[73] Assignee: Texas Instruments Incorporated, Dallas, Tex.

[21] Appl. No.: 681,949

[22] Filed: Apr. 30, 1976

[30] Foreign Application Priority Data

May 23, 1975 Germany ............................ 2522920

[51] Int. Cl.[2] ............................................... H04B 1/06

[52] U.S. Cl. ......................... 340/171 PF; 340/171 R; 325/391

[58] Field of Search ............................... 178/DIG. 15; 340/146.1 BA, 171 R, 171 PF, 171 A; 325/391

[56] References Cited

U.S. PATENT DOCUMENTS

| | | | |
|---|---|---|---|
| 3,523,278 | 8/1970 | Hinkel | 340/146.1 BA |
| 3,737,577 | 6/1973 | Birkin | 340/146.1 BA |
| 3,863,215 | 1/1975 | McGrogan | 340/146.1 BA |
| 3,876,980 | 4/1975 | Haemmig | 340/146.1 BA |
| 3,980,956 | 9/1976 | Woolling | 178/DIG. 15 |

*Primary Examiner*—Harold I. Pitts
*Attorney, Agent, or Firm*—Harold Levine; Richard L. Donaldson; James T. Comfort

[57] ABSTRACT

A remote control receiver for producing different control signals in response to operating signals of respectively different frequencies. The receiver includes operating signal frequency counter which counts operating frequency oscillations in repeated counting cycles and produces an output signal when a predetermined count has been reached. The output signal controls a reference frequency counter which counts the number of reference frequency oscillations in each counting cycle. The count of the reference frequency counter reached during each counting cycle is stored and at the end of each counting cycle, a comparator compares the current count of the reference frequency counter with the stored count. The comparator produces a signal indicating agreement or non-agreement of the compared counts. An error register accepts every comparison result and passes a control signal to the receiver output associated with the particular operating signal being received, only when a predetermined number of agreements has been reached.

8 Claims, 5 Drawing Figures

REMOTE CONTROL RECEIVER

BACKGROUND OF THE INVENTION

The invention relates to a remote control receiver for the reception of command signals of different operating frequencies, each in an individual channel. The receiver has a plurality of outputs, each assigned to one of the channels, a control signal being produced at a particular output upon the reception of a command signal having the corresponding operating frequency.

In a remote control receiver of this kind, the command generated by the associated transmitter and intended to produce a signal at a particular output of the receiver is expressed by the frequency of the transmitted signal. Therefore, the receiver must be able to recognize this operating frequency accurately to produce the desired control signal from the output associated with this frequency. Resonant circuits tuned to one of the operating frequencies emitted by the transmitter may be used to identify the various frequencies.

However, the setting up of a remote control receiver equipped with resonant circuits requires much labor to tune the various resonant circuits. The detuning of the resonant circuits, which is inevitable in the course of time, makes it necessary to repeat the tuning process after the receiver has been in operation for a certain period of time. Another disadvantage of receivers equipped with resonance circuits is that the coils needed in the resonant circuits require signification space. The disadvantage of this factor increases with the number of operating frequencies to be identified. But the use of coils is also disadvantageous since such a remote control receiver cannot be produced by integrated circuit technology because, from a practical viewpoint, the coils cannot be made by this technology.

Resonant circuits have the further disadvantage that, in principle, they respond to any oscillation whose frequency equals the resonance frequency. Therefore, if a spurious signal is in the operative frequency range of the receiver, for example, a control signal will be generated at the respective output in response to this spurious signal. In other words, spurious and noise signals may also trigger generation of a control signal in an undesired manner. Another disadvantage of resonance filter selection is that the receiver sensitivity is maximum only at the center frequency of the resonant circuit and falls steeply off towards the channel limits.

A remote control receiver has also been proposed in which the number of cycles of the operating frequency arriving during a defined measuring period are counted and a control signal emitted as a function of the result of the count. For the precise analysis of the frequency received, the duration of the measuring period must be fixed precisely and kept very constant. The circuit stage determining the duration of the measuring period must be accurately adjusted before the start-up of the remote control receiver so that the desired counting results will accurately be obtained when counting the operating frequency cycles received.

Accordingly, it is an objective of the invention to provide a remote control receiver of the kind initially described which need not be tuned, incorporates a high protection factor against response to spurious received signals and can be entirely produced by integrated circuit technology.

A remote control receiver according to the invention includes an operating frequency counter which counts in repeated counting cycles respective operating frequency oscillations and emits an output signal when the counter reaches a predetermined count; a reference frequency counter which is controlled by the output signal of the operating frequency counter and counts the reference oscillations in each counting cycle of the operating frequency counter; a storage device to store a reference frequency counter count reached in a counting cycle; a comparator circuit which compares after each counting cycle the reference frequency counter count with the content of the storage device and produces, as the result of the comparison, a signal indicating agreement or nonagreement; and an error register arrangement which accepts and stores every comparison result and passes a control signal to the output associated with the particular operating frequency received only when a predetermined number of agreements has been reached.

In a receiver designed in accordance with the invention, an operating frequency counter counts a predetermined number of operating frequency oscillations. An output signal from the operating frequency controls a reference frequency counter so that the latter counts reference frequency oscillations for the period of time during which the predetermined number of operating frequency oscillations is received. The reference frequency counter count reached after the reception of the predetermined number of operting frequency oscillations, therefore, is directly related to the operating frequency received. The counter count reached in one counting cycle of the operating frequency counter can be stored in a storage device whose content is then compared in a comparator circuit with the new reference frequency counter count reached after each counting cycle of the operating frequency counter. The output signal of the comparator circuit indicating agreement or nonagreement of the compared values is supplied to an error register arrangement which produces a control signal at the output associated with the operating frequency received only after a predetermined number of successive, uninterrupted agreements of the compared values has been reached.

A remote control receiver embodying the invention can be constructed exclusively of circuit elements which do not have to be tuned to specific frequencies. Inasmuch as no coils are used, such a receiver is amenable to production completely in the form of an integrated circuit. Consequently the entire receiver may be produced in a form occupying but very little space.

A remote control receiver embodying the invention also provides a high degree of safety against temporarily occurring interference frequencies. Due to the fact that the error register arrangement enables the generation of the control signal at the output associated with the operating frequency received only after a predetermined number of agreements has been reached, an interference frequency of short duration stemming from an interfering transmitter will not activate the control signal because this control signal emission occurs only after a longer duration of that frequency received constantly and unchanged.

A remote control receiver embodying the invention is preferably designed so that the error register arrangement includes an output at which a signal is produced after a predetermined number of nonagreements has been reached; that the storage device presents an input connected to the output of the error register arrangement; and that the transfer of the reference frequency counter count into the memory is enabled as a function of the signal at the output of the error register arrangement. Due to this further development, the storage device does not accept every reference counter count, and this acceptance operation is triggered only if a signal is applied to a control input of the storage device.

SUMMARY OF THE INVENTION

In an advantageous further development of the remote control receiver embodying the invention the error register arrangement includes a shift register composed of several flip-flop stages presenting direct and complementary outputs for the production of signals indicating the respective state of the stage; there are connected to the complementary outputs of all flip-flop stages of both counter and memory inputs of a logic circuit which, upon the presence of signals indicating that all those flip-flop stages are in a particular one of their two logic states, produces a signal enabling the generation of the control signal; there are connected to the direct outputs of some of the flip-flop stages the inputs of another logic circuit which, upon the presence of signals indicating that one or more of said stages is in the other one of said two logic states and upon reception of the output signal emitted by the operating frequency counter, generates the signal which enables the transfer of the reference counter count into the storage devices. In accordance with this further development, the control signal for the release of the transfer of the reference frequency counter count into the storage device and the deactivation of the output signal is generated only after a predetermined number of nonagreements has been determined in the comparator circuit. This accomplishes, on the one hand, that a counter count already stored in the storage device need not be accepted again by the reference counter and that, on the other hand, a temporary deviation of the operating frequency from its nominal value does not immediately lead to a change in the content of the storage device and to a change of the emitted control signal. The transfer of a new reference frequency counter count into the storage device is released only if a new frequency deviating from the previously received frequency, or no frequency at all, is received for a longer period of time, whereupon the production of a control signal occurs at the output associated with the newly received operating frequency.

BRIEF DESCRIPTION OF THE DRAWINGS

By way of example, an embodiment of the invention will be described in greater detail with reference to the drawings, in which.

DESCRIPTION OF THE PREFERRED EMBODIMENT

Figure 1:
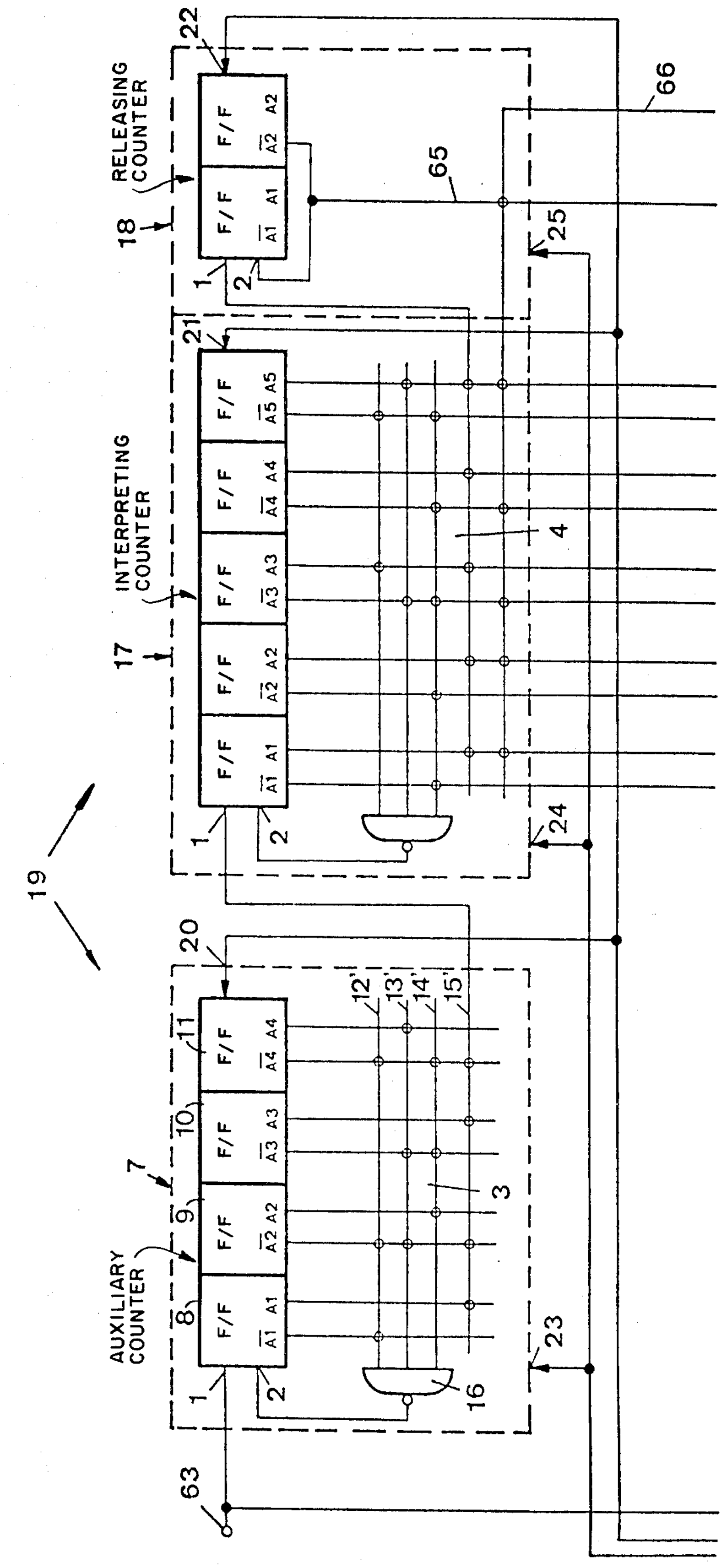
FIGS. 1, 2 and 3 represent a composite logic diagram where FIG. 2 adjoins the bottom of FIG. 1 and FIG. 3 the bottom of FIG. 2 as shown in FIG. 5.

The remote control receiver shown in the drawings contains several counters, each comprising several flip-flop circuits connected in series to form a shift register. Each counter includes a clock input 1 and a data input 2. With each clock signal arriving at the clock input 1, the data signal at the data input is entered into the first stage of the counter and propagated along the shift register counter from stage to stage by the succeeding clock signals. Each one of the various stages of the shift register counter includes a direct output and a complementary output. The various outputs are respectively marked in the drawing with the letter A and the stage number of the shift register counter, for the direct outputs, and by $\overline{A}$ and the number at the complementary output to indicate appearance of the direct output in negated form.

The counting capacity of the various shift register counters is determined by a decode logic circuit to which the output signals of the various stages are introduced. These decode logic circuits 3, 4, 5, 6 are shown symbolically in FIGS. 1 to 3 in the form of a matrix. Feeding the output signals of the various counter stages back to the data input via the logic circuit determines after which counter the counter starts a fresh counting cycle.

Figure 2:
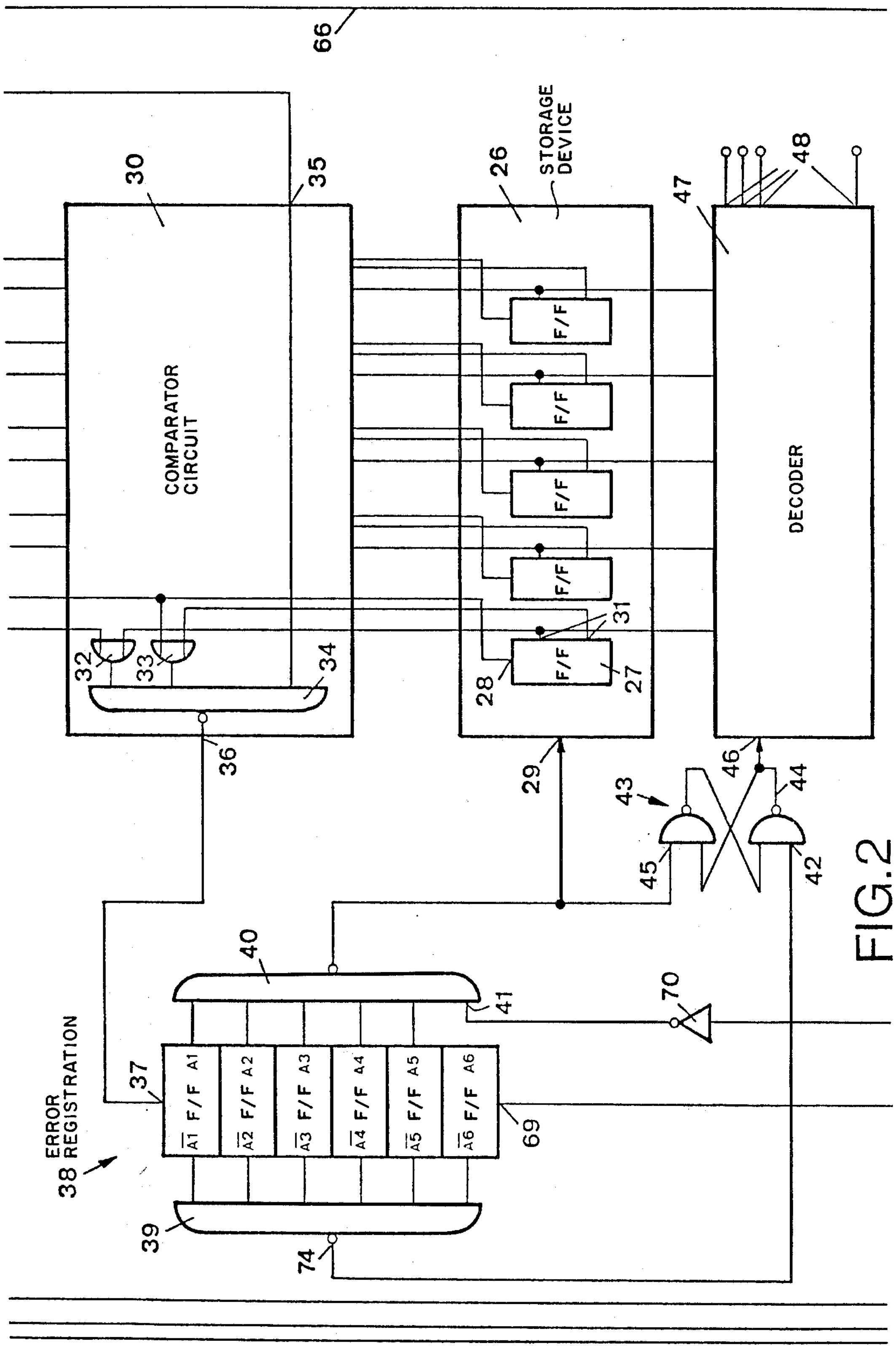
Figure 3:
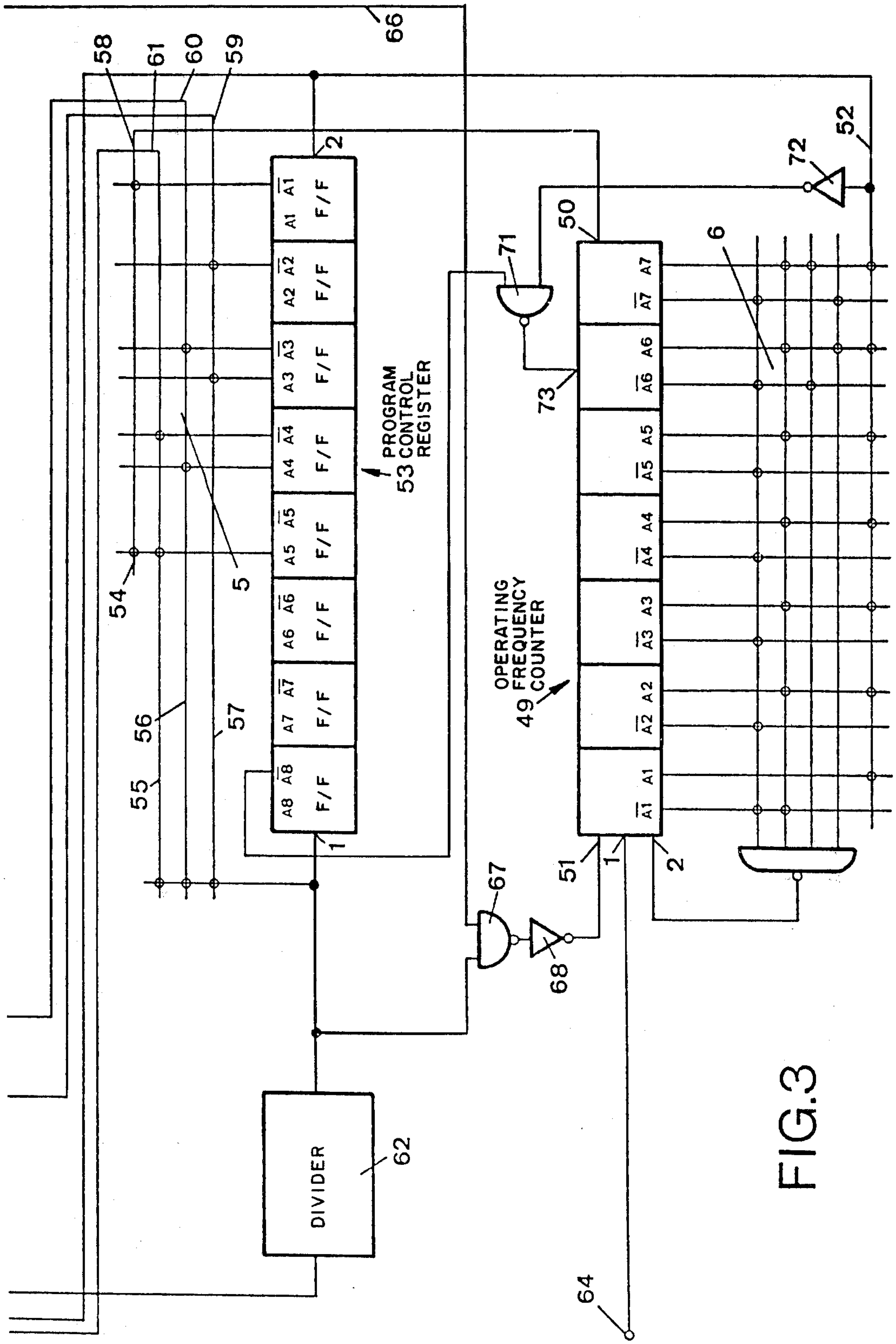
Figure 4:
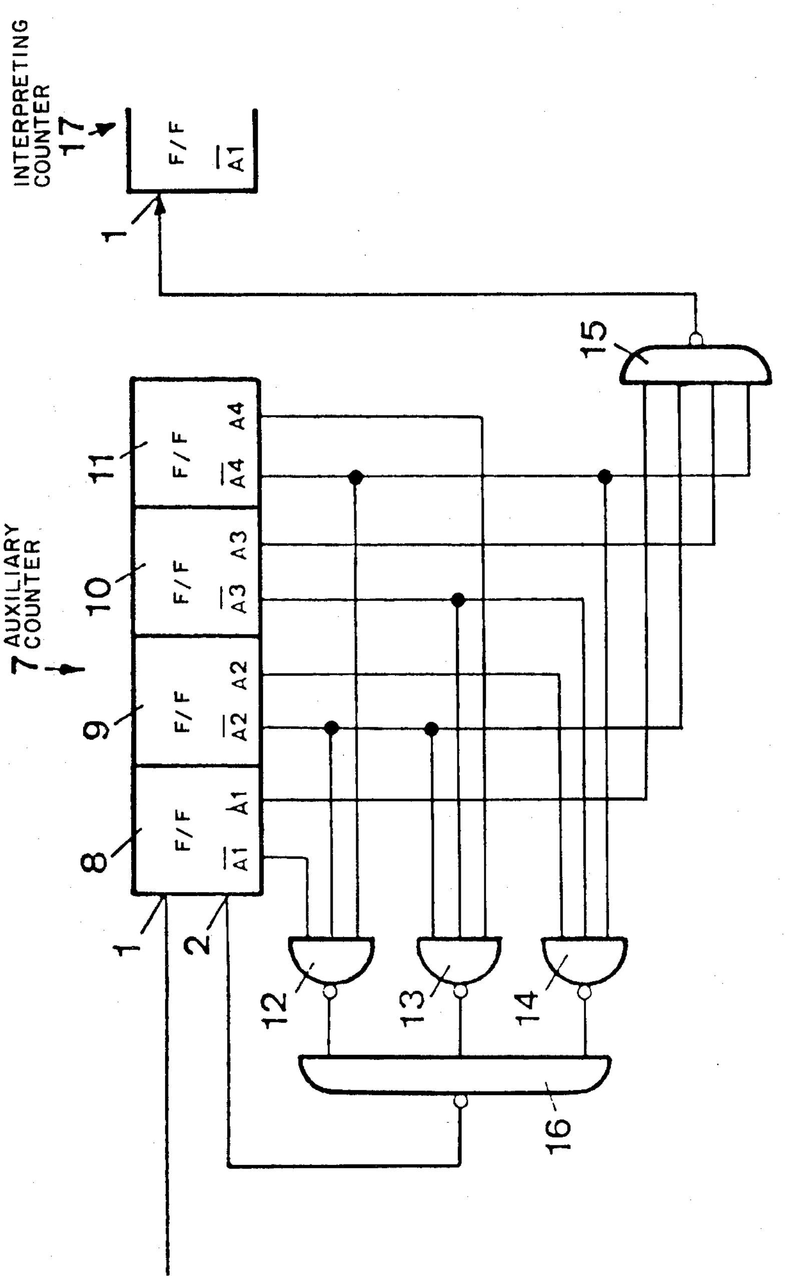
FIG. 4 is a detail logic diagram of a counter and its decode logic, in further explanation of FIGS. 1 to 3.
Figure 5:
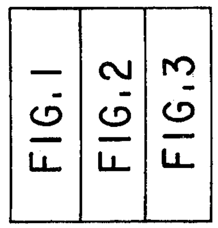

To explain the logic circuits shown symbolically in FIGS. 1 to 3, reference is made to FIG. 4 which shows a detail wiring diagram of the logic circuit 3 connected to an auxiliary counter section shown in FIG. 1. As may be seen from FIG. 4, the outputs of the four stages 8, 9, 10, 11 of the auxiliary counter section 7 are connected in a selected manner to NAND circuits 12, 13, 14, and 15. The outputs of the NAND circuits 12, 13 and 14 are connected to the inputs of another NAND circuit 16 whose output is connected to the data input 2 of the first counter stage 8. The counting capacity of the auxiliary counter section 7 is determined by connecting selected outputs of the counter stage to selected NAND circuits. The logic circuit design shown in FIG. 4 accomplishes that the auxiliary counter section 7 runs through a count of eleven before starting a fresh count cycle. The NAND circuit 15 which has four inputs, each connected to one output of the counter stages, produces an output signal when the auxiliary counter section 7 has reached its highest count i.e. eleven. This output signal is fed as clock signal to the clock input 1 of an interpreting counter section 17 connected in series to the auxiliary counter section 7.

In the decode logic circuit of the auxiliary counter section 7 shown in matrix form in FIG. 1, the NAND circuits 12, 13, 14 and 15 are represented by horizonal lines 12', 13', 14', and 15', respectively, and each one receives an input signal from the vertically shown output line of the counter stages marked by a circle at the intersection with the horizontal lines 12', 13', 14' and 15'. For example, the NAND circuit 12 symbolized by the horizontal line 12' receives input signals from the counter stage outputs $\overline{A}^1$, $\overline{A}^2$ and $\overline{A}^4$, while the NAND circuit 13 symbolized by the horizontal line 13' receives input signals from the counter stage outputs $\overline{A}^2$, $\overline{A}^3$, $A^4$.

In conjunction with the interpreting counter section 17 and a releasing counter section 18, the auxiliary counter section 7 shown in FIG. 1 forms a reference frequency counter 19, to the first section of which, the auxiliary counter section 7, a pulse sequence of constant recurrence frequency is supplied, generated by reference frequency oscillations from a (not shown) reference frequency generator. Whenever the auxiliary counter section 7 reaches its highest count, it transmits a pulse to the clock input 1 of the interpreting counter section so that, for all practical purposes, it acts a reference frequency divider. As already explained in connection with FIG. 4, the auxiliary counter section 7 contains four counter stages 8, 9, 10 and 11, and the effect of the decode logic circuit 3 connected to the stage outputs is that the auxiliary counter section 7 starts a fresh count cycle after each eleventh reference frequency pulse received.

The interpreting counter section 17 consists of five series-connected counter stages whose stage outputs are wired via a decode logic circuit 4 in a manner similar to that employed for the auxiliary counter section 7, but so that a counting capacity of 31 results. Every time the interpreting counter section 17 reaches its highest count, it emits an output signal to the clock input 1 of the releasing counter section 18 which is composed of two series-connected stages, and has a counting capacity of 4.

The reference frequency counter 19 formed by the auxiliary counter section 7, the interpreting counter section 17 and the releasing counter section 18 has release inputs 20, 21 and 22 through which operation of the reference frequency counter can be started by applying an appropriate release signal of the signal value "1". The reference frequency counter 19 counts the reference frequency pulses supplied to it as long as the release signal is applied to the release inputs 20, 21 and 22.

Furthermore, the reference frequency counter 19 has preset inputs 23, 24 and 25; applying a setting signal to these inputs sets the reference frequency counter 19 to a defined starting value, from which it starts counting.

The remote control receiver is equipped with a storage device 26 shown in FIG. 2, capable of storing a count of the interpreting counter section 17 reached at a certain time. The storage device 26 is composed of five flip-flop circuits 27 whose inputs 28 are connected to one direct output each of a counter stage of the interpreting counter section 17. If a transfer signal is applied to a transfer input 29 of the storage device 26, the count of the interpreting counter section 17 is transferred in parallel into the storage device 26.

Also connected to the counter stage outputs of the interpreting counter section 17 are the inputs of a comparator circuit 30 which also communicates with the outputs 31 of the flip-flop circuits 27 of the storage device 26. This comparator circuit enables the comparison of the count of the interpreting counter section 17 with the content of the storage device 26. In this comparing process, the content of the first counter stage of the interpreting counter section 17 is compared with the content of the first flip-flop circuit 27 of the storage device 26, and the succeeding counter stages are then compared in the same manner with the contents of the other flip-flop stages 27.

The comparator circuit 30 shows in detail, exactly how the comparing process is carried out in the first counter stage of the interpreting counter section 17 and the first flip-flop circuit 27 of the storage device 26. As may be seen, the two outputs of the first counter stage are connected to one input each of two OR circuits 32 and 33 whose other inputs are respectively connected to the outputs 31 of the first flip-flop circuit 27 of the storage device 26. The outputs of the OR circuits are connected to the inputs of a NAND circuit 34, to which are also connected the outputs of all other OR circuits (not shown) connected to the outputs of the other counter stages and flip-flop circuits 27. If the contents of the counter stages and of the corresponding flip-flop circuits 27 agree, all OR circuits 32, 33 of the comparator circuit 30 produce a logic 1 signal. In addition to the inputs connected to the outputs of the OR circuits, the NAND circuit 34 has another input which is connected to a release input 35 of the comparator circuit 30. Only when a logic 1 signal also is applied to this release input does the NAND circuit 34 produce as result of the comparison, a logic 0 signal, indicating agreement of the compared values. In case of nonagreement of the compared values and also in the absence of the release signal, the NAND circuit 34 always produces a logic 1 signal.

Connected to the output 36 of the comparator circuit 30 is the input 37 of an error register arrangement 38 including a shift register composed of six series-connected flip-flop circuits. To the complementary outputs of all flip-flop circuits are connected the inputs of a NAND circuit 39 which produces a logic 0 signal if logic 0 signals were received by all the flip-flop circuits from the comparator circuit 30. The direct outputs of the first five flip-flop circuits are connected to the inputs of another NAND circuit 40 which produces a logic 0 output if the first five flip-flop circuits have received from the comparator circuit logic 1 signals, and if a logic 1 signal has been supplied to another input 41 of the NAND circuit 40.

The output of the NAND circuit 39 is connected to a switching input 42 of a flip-flop circuit 43 which produces at its output 44 a release signal after having received from the NAND circuit 39 a logic 0 output signal. The other switching input 45 of the flip-flop circuit 43 is connected to the output of the NAND circuit 40; a logic 0 signal at this switching input 45 of the flip-flop circuit 43 results in the release signal not being emitted from output 44. The output of the NAND circuit 40 is also connected to the transfer input 29 of the storage device 26.

The output 44 of the flip-flop circuit 43 is connected to the release input 46 of a decoder 47 whose inputs are connected to the outputs 31 of the flip-flop circuits 27 of the storage device 26. The decoder 47 can decode the content of the storage device, and it emits from one of its outputs 48 a control signal as a function of the content of the storage device.

FIG. 3 shows an operating frequency counter 49 composed of seven series-connected flip-flop circuits. The operating frequency counter 49 can be disabled by a control signal at an input 50 and can be set to a certain starting value by an input signal at a preset input 51. To the outputs of the flip-flop circuits forming the counter stages is connected the logic circuit 6 which is designed so as to establish the counting capacity of the operating frequency counter 49 as the value 73. The output 52 of the logic circuit 6 of the operating frequency counter 49 is connected to the release inputs 20, 21 and 22 of the reference frequency counter 19. A signal enabling the reference counter to count is produced at this output 52 for the period of time during which the operating frequency counter 19 completes its counting cycle, i.e. in which it counts from 0 to 72.

Also connected to the output 52 of the logic circuit 6 is the data input 2 of a program control register 53 composed of eight flip-flop circuits connected to form a shift register. The purpose of the program control register 53 is to generate, starting with the moment when the operating frequency counter 49 has completed its counting cycle, successive control signals required to trigger verious operations in the remote control receiver. These various control signals are generated by means of the logic circuit 5 which is connected to the outputs of the first five flip-flop circuits of the program control register 53, and, like the other logic circuits 3, 4 and 6, are shown in the overall wiring diagram symbolically in the form of a matrix. Here again, the four horizontal lines 54, 55, 56 and 57 represent NAND circuits at whose outputs 58, 59, 60 and 61 appear the various control signals. How these control signals are generated and the functions they perfrom is described in greater detail in the description below of the operating mode of the remote control receiver.

The information supplied to the data input 2 of the program control register 53 is clocked through the program control register at the clock frequency supplied to the clock input from the reference frequency input 63 by a divide by 2 divider 62.

It is assumed in the following description of the operating mode of the remote control receiver that the operating frequency range is in the supersonic range between 33.5 and 43.4 kHz and that this range is divided into 20 frequencies, each in an individual channel. The reference frequency is 455 kHz.

The reference frequency oscillation and the operating frequency oscillation are fed to the reference frequency input 63 and to the operating frequency input 64, respectively, not in the form of sine waves, but in the form of rectangular pulses. For this purpose, the respective reference frequency may be generated directly as square signal in a square wave generator. The operating frequency oscillations contrariwise, are usually received as sine waves and transformed to square pulses whose recurrence frequency equals the frequency of the operating frequency oscillation, such as by means of a Schmitt Trigger (not shown).

Assuming now that the remote control receiver is turned on, but that no operating frequency pulses are received by the operating frequency input 64. At the starting time, the count in the counters contained in the remote control receiver is undefined and random, and so is the content of the storage device. Directly after starting, the reference frequency input 63 continuously receives reference frequency pulses which reach the clock input 1 of the auxiliary counter section 7 and, via the divider 62, to the clock input 1 of the program counter section 53. Due to the fact that the count in the operating frequency counter 49 certainly is at a level at which the value "1" is stored in some counter stages and the value "0" is others, the output 52 of the logic circuit 6 emits a signal of the value "1" which is fed the data input 2 of the program control register 53 and, as release signal, to the release inputs 20, 21 and 22 of the various sections of the reference frequency counter 19.

As already mentioned, the operating frequency counter 49 has a counting capacity of 73 which means that it goes through 73 counts before starting a fresh count cycle. At the output 52 of the logic circuit 6 it produces a logic 1 signal for the duration of 72 periods of the operating frequency oscillation, and this duration is utilized to determine the operating frequency received, as the reference frequency counter 19 is in operation only during this period of time.

As may be computed from the above numerical values, the measuring time of interest ranges approximately from 2.16 ms at the lowest operating frequency to 1.65 ms at the highest operating frequency. If the reference frequency counter 19 is designed as indicated above, it turns out that, at these numerical values and at the assumed reference frequency, 88 pulses are supplied to the clock input 1 of the interpreting counter section 17 by the auxiliary counter section 7 during the 72 operating signal periods at the lowest frequency, and 68 pulses at the highest frequency. The interpreting counter section, having a counting capacity of 31, is in its third counting cycle after having been supplied with these 68 to 88 clock pulses. It is only this range from 68 to 88 supplied clock pulses which are of interest for the interpretation. That the interpreting counter section 17 is in its third counting cycle is indicated by the production of a release signal at line 65 of the release counter section 18.

As long as a logic 1 release signal is applied to the inputs 23, 24 and 25 of the reference frequency counter 19, the latter is cleared to count the reference frequency pulses supplied to it. As no pulses are supplied to the operating frequency counter 49 its incidental count does not change, and the release signal at the reference frequency counter 19 remains, even after the interpreting counter section has been fed the greatest number of pulses of the 68 to 88 pulse range of interest. When the interpreting counter section 17 reaches a count corresponding to 89 pulses supplied to its clock input 1, then a signal is produced on line 66, causing with the next output pulse from the divider 62 via the NAND circuit 67 and the inverter 68, application of a logic 1 signal at the present input 51 of the operating frequency counter 49 that the operating frequency counter is set to a count at which the value "1" is stored in all counter stages.

At this operating frequency counter count, a logic 0 signal is produced at the output 52 of the logic circuit 6, with the effect that the reference frequency counter 19 stops counting.

With the introduction of the $89^{th}$ pulse to the clock input 1 of the interpreting counter section 17, a signal also reaches the release input 35 of the comparator circuit 30, which signal enables the comparing process between the content of the storage device 26 and the current status of the interpreting counter section 17. Due to the fact that, as mentioned earlier, a random value is stored in the storage device 49, it is certain that the comparator circuit 30 will determine nonagreement of the compared values and will produce at its output 36 a logic 1 signal, indicating this nonagreement. This logic signal at output 36 is supplied to the input 37 of the error register arrangement 38.

At the same time, the logic 0 signal at the output 52 also reaches the data input of the program control register 53, in the stages of which the logic values "1" are stored. Synchronously with the output pulses of the divider 62, logic "0" values are now entered consecutively into the various stages of the program control register 53. The decode logic circuit 5, connected to the outputs of the first five stages of the program control register 53, now causes the following program sequence:

With the input of the logic signal "0" into the first stage of the program control register 53 via the data input 2 upon the first clock pulse from the divider 62, a signal is emitted from the output 58 of the logic circuit 5, disabling the operating frequency counter 49. This disabling signal is maintained until a logic "0" is stored in the first five stages of the program control register 53.

With the next clock pulse from the divider 62, the value "0" is transferred from the first stage of the control register 53 to the second stage, and the value "0" is again entered into the first stage. Now the output 59 of the logic circuit 5 emits a pulse to the clock input 69 of the error register arrangement 38, with the effect that the logic 1 at input 37 is entered into the first stage of the register.

With the next clock pulse from the divider 62, the logic "0" also reaches the third stage of the program control register 53 so that the output 60 of the logic cir^uit 5 now emits a logic 0 control signal which is supplied via the interter 70 to the input 41 of the NAND gate 40. Since random values were stored in the various stages of the error register arrangement 38 when the remote control receiver was turned on, it may safely be assumed that the value "1" is not stored in all stages whose direct outputs are connected to the other inputs of the NAND gate 40. Therefore, this NAND gate 40 produces a logic 1 signal, bringing the flip-flop circuit 43 into a state in which it emits from its output 44 a clocking signal which is applied to the release output 46 of the decoder 48. Therefore, the decoder 48 cannot decode the content of the storage device.

With the next clock pulse from the divider 62, the logic "0" also reaches the fourth stage of the program control register 53. The logic circuit 5 now produces at its output 62 a logic 0 signal which is applied to the preset inputs 23, 24 and 25 of the reference frequency counter 19, setting it to a defined starting value, from which the next count is started after a new release.

When the next clock pulse from the divider 62 reaches the clock input 1 of the program control register 53, the logic "0" is also entered into the fifth stage of this register. The consequence thereof is that the logic 0 signal applied to the disabling input 50 of the operating frequency counter 49 in the first control phase of the program control register 53, is switched back to a logic 1, so that the operating frequency counter 49 could start counting operating frequency pulses again, if its clock input 1 were supplied with such operating frequency pulses. But since the operating frequency counter 49 does not change its count, retaining in all stages the value "1" set by the signal at input 51, the remaining stages of the program control register 53 are filled with the logic "0" signals synchronous with the output signals from the divider 62. When finally the value "0" is stored in the eighth stage, the latter's complementary output applies a logic 1 signal to the NAND gate 71 which, due to the signal value "1" supplied to its other input via the inverter 72, produces at its output a logic 0 signal. This logic 0 signal is entered into the sixth stage of the operating frequency counter 49 via the input 73. This input of the signal value "0" into a stage of the operating frequency counter 49 occurs so that the count of the operating frequency counter will again assume a value at which a signal releasing the reference frequency counter 19 to count the reference frequency pulses applied to it, is again produced at the output line 52 of the associated logic circuit 6.

Now the reference frequency counter 19 continues counting again until the $89^{th}$ pulse is again supplied to the clock input 1 of the interpreting counter section 17. From this moment on, the above sequence of functions forming one interpretation cycle is repeated.

With every repetition of the above described sequence of functions, the logic 1 value of the output signal from the comparator circuit 30 is entered into the first stage of the error register arrangement 38, until finally the first five stages are set to the signal value "1" which indicates nonagreement of the content of the storage device 26 with the count of the interpreting counter section 17. Now the logic 1 signals are applied to all inputs of the NAND gate 40 connected to these first five stages so that, with the fifth repetition, the logic 1 signal supplied by the program control register 53 to the input 41 of the NAND gate 40 results in a logic 0 signal at the output of this NAND gate, which is applied as a transfer signal to the input 29 of the storage device 26. The storage device now receives the current count of the interpreting counter section 17. It is only now that a defined content is contained in the storage device 26, namely the count resulting from the application of the $89^{th}$ pulse to the clock input 1 of the interpreting counter section 17.

Now, when the comparing process is released in the next interpretation cycle, the comparator circuit 30 finds agreement between the content of the storage device and the count of the interpreting counter section because it, too, is beyond the count resulting from the application of the $89^{th}$ pulse to the clock input 1 of the interpreting counter section 17. Consequently, a logic 0 signal is produced at the output 36 of the comparator circuit 30 by the NAND gate 34, indicating agreement of the two compared values. In the interpretation cycle just completed, this logic 0 signal is transferred into the first stage of the error register arrangement by the control signal generated at output 59 of the logic circuit 5 of the program control register 53 and supplied to the clock input 69 of the error register arrangement 38.

Since now the value "1" is no longer stored in all stages of the error register arrangement 38 connected to the inputs of the NAND gate 40, the latter no longer applies a transfer signal to the input 29 of the storage device 26, so that the stored content remains unchanged for the time being.

In the next interpretation cycle, the stored content is again found to agree with the count of the interpreting counter section 17 so that the transfer of another logic 0 signal into the error register arrangement 38 is released by the program control register 53. This is continued in the subsequent interpetation cycles until the value " " is stored in all six stages of the error register arrangement 38.

When the value "0" is stored in all stages of the error register arrangement 38, a logic 1 signal reaches all inputs of the NAND gate 39 connected to the complementary output of the stages of the error register arrangement 38, so that this NAND circuit will produce at its output 74 a logic 0 signal which resets the flip-flop circuit 43 into its other state. In this state, the flip-flop circuit 43 produces at its output 44 a release signal to the release input 46 of the decoder 47, enabling it to decode the content of the storage device 26.

Since, in the case studied here no operating frequency signals are supplied to the operating frequency input 64, the decoder 47 must not emit a control signal from any of its outputs 48 either. As is evident from the above description, a value not corresponding to a received operating frequency is stored in the storage device 26 at this point in time. The decoder 47 is designed only for the decoding of values corresponding to a received operating frequency so that it cannot decode the content of the storage device resulting from receiving no operating frequency signals. Consequently, even when enabled for decoding by a signal at its input 46, the decoder 47 will not emit a control signal from any of its outputs 48.

Now, if the remote control receiver remains turned on and no operating frequency signal is received at its operating frequency input 64, the above described interpretation cycles will repeat constantly, and the value "0" will constantly be stored in all stages of the error register arrangement 38.

Let us now consider the case in which the operating frequency input 64 does receive an operating frequency signal consisting of a sequence of pulses whose recurrence frequence represents the information which is supposed to bring about a control signal at an output 48 of the decoder 47.

As may be gathered from the above description, if no operating frequency signal is received, the operating frequency counter 49 is either in a state in which the value "1" is stored in all stages of the counter, or in a state in which stage 6 contains the value "0" and the values "1" are stored in all other stages. In the former state, the operating frequency counter 49 is inhibited by the inhibit signal supplied at its input 50 by the program control register 53 so that the operating signal pulses supplied to its clock input 1 remain ineffective.

But in the latter state, the operating frequency counter 49 counts the pulses supplied to its clock input 1 until it reaches a count at which the signal value "1" is stores in all its stages. In this preparatory counting process, this count is not reached after the above mentioned 72 operating signal periods because the counting process was started not at the lowest, but at an intermediate value.

After reaching the final count at which the value "1" is stored in all stages of the operating frequency counter 49, a first interpretation cycle starts. The logic 0 signal, produced upon the attainment of the final count of the operating frequency counter 49 by the output 52 of the decode logic circuit 6, inhibits the reference frequency counter 19; it also reaches the first stage of the program control register 53. The first control signal emitted by the program control register 53 and supplied to the inhibit input 50 of the operating frequency counter 49, inhibits this counter. The second control signal at the output 59 of the decode logic circuit 5 of the program control register 53 reaches the clock input 69 of the error register arrangement 38, effecting the transfer of the signal value at input 37 to the first stage of the error register arrangement 38. The signal value at input 37 is, in any event, a logic 1 signal indicating non-agreement of the compared values because the count of the interpreting counter section 17 attained up to the clearing of the reference frequency counter 19 is certainly lower than the count attained without the application of an operating signal to the operating frequency input 64 and stored in the storage device 26.

The control signal emitted by the output 60 of the logic circuit 5 and reaching the input 41 of the NAND gate 40 remains without effect because the logic 1 signal which would lead to the production of an effective control signal is not applied to all inputs of the NAND gate 40.

With the fourth control signal produced by the program control register 53 at the output 61 the reference frequency counter 19 is set to a certain starting count. With the fifth clock pulse from the divider 62 supplied to the clock input 1 of the program control register 53 the inhibit signal at the input 50 of the operating frequency counter 49 is removed so that the operating frequency counter now starts counting, starting with the lowest count until it reaches the count at which the value "1" is contained in all counter stages, which timewise takes 72 operating signal periods.

The number of clock pulses from the auxiliary counter section 7 which arrive at the clock input 1 of the interpreting counter section 17 during the 72 operating signal periods now represents for the first time exact information on the operating frequency received.

With the attainment of the final count in the operating frequency counter 49 the reference counter 19 is stopped and the control sequence of the program control register 53 is commenced, as has been described several times already. As in the sequences described above, this control sequence first provides for inhibiting the operating frequency counter 49, then for transferring the result of the comparison from the comparator circuit 30 into the error register arrangement 38, for the application of a logic 1 signal to the input 41 of the NAND gate 40 and finally for the setting of the reference frequency counter 19 to a predetermined starting count.

No transfer signal having been applied so far to the transfer input 29 of the storage device 26, the content of the storage device still equals the count of the interpreting counter section 17 which resulted in the interpretation cycle prior to the reception of an operating signal. For this reason, the signal at output 36 of the comparator circuit 30 is a logic 1, indicating non-agreement of the compared values. The logic 1 is now stored in the first two stages of the error register arrangement 38.

With the application of the fifth clock pulse from the divider 62 to the clock input 1 of the program control register 53 the operating frequency 49 is released again for counting the operating frequency pulses supplied to it. The just described sequence is now repeated as often as needed to cause the control sequence initiated by the respective attainment of the final count of the operating frequency counter 49 to have the logic 1 also reach the fifth stage of the error register arrangement 38.

Directly after the transfer of the logic 1 into the fifth stage of the error register arrangement 38, triggered by the control signal at output 59 of the logic circuit of the program control register 53, a control signal effecting the application of a logic 1 signal to the input 41 of the NAND gate 40 is generated at the output 50. The NAND gate 40 now supplies to the transfer input 29 of the storage device 26 a signal of the signal value "0" so that the storage device receives the count of the interpreting counter section 17. At the same time, this output signal of the NAND gate 40 reverses the flip-flop circuit 43 into a state in which its output 44 applies an inhibit signal to the enable input 46 of the decoder 47.

If the operating frequency signal received up to this point continues to be received, the meanwhile re-enabled operating frequency counter 49 counts until it reaches its final count, whereupon a new interpretation cycle is initiated again. Since the interpreting counter section 17 reaches, in the course of the operating signal periods counted by the operating frequency counter 49, the same count again as it did in the preceding counting cycle of the operating frequency counter 49, agreement of the count in the intepreting counter section 17 with the content of the storage device 26 is found in the interpreting cycle now in progress. Therefore, a logic 0 is entered in the first stage of the error register arrangement 38, indicating this agreement.

The logic 0 is entered in the error register arrangement 38 during every additional interpretation cycle until the logic 0 is finally stored in all six stages. At this point in time, the NAND gate 39 produces at its output 74 a logic 0 signal, reversing the flip-flop circuit 43 into a state in which it validates the decoder 47. The decoder 47 now decodes the content of the storage device and produces, at its output 48 associated with the particular stored content, the desired control signal.

It is clear from the above description of the functions performed that at least 11 interpretation cycles must be completed before a control signal is produced for the first time at any one of the decoder outputs. This represents a desirable safety measure because this way, temporarily occurring interference signals in the operating frequency range do not lead to the generation of a control signal at a decoder output. Only when a new signal is applied to the operating frequency input 64 for the duration of at least 11 interpretation cycles, i.e. for the duration of at least 11 times 72 periods of the signal received, is the decoder 47 validated to decode the new content now in the storage device 26.

The remote control receiver here described is not only well protected against temporary interference signals, it also continues to function properly when the received operating signal breaks down temporarily. If the operating signal received at input 64 breaks down temporarily, the operating frequency counter 49 reaches its final counter later than corresponds to the duration of 72 operating signal periods. Therefore, the interpreting counter section 17 receives more clock pulses during this longer time period so that its count attained at the end of 72 received operating frequency periods. Due to the fact that the correct count is still stored in the storage device 26, the comparator circuit 30 produces a signal indicating non-agreement of the compared values. The operating signal may fail for the duration of up to four interpretation cycles without changing the content of the storage device 26 which is constantly decoded by the validated decoder. If the operating signal reappears after the fourth interpretation cycle, there is no change whatever in the content of the storage device so that the control signal continues to be produced at the appropriate output 48 of the decoder 47, uninfluenced by the temporary breakdown of the operating signal. Only if the breakdown lasted as long as five interpretation cycles would the NAND gate 40 emit an output signal leading to the transfer of a new count to the storage device and the reversal of the flip-flop circuit 43 into a atate in which the decoder 47 is inhibited.

Of course, the interpreting counter section 17 and the releasing counter section 18 of the reference frequency counter 19 could be combined into one single, seven stage counter section; in such a case, the count which this seven stage counter reaches in the course of one interpretation cycle would represent the information which must be used for the interpretation. As is immediately clear from the drawing, the count of the interpreting counter section 17 is connected to the comparator circuit 30 and also transferred in parallel into the storage device. Therefore, for each counter stage of the interpreting counter sectin 17 there must be present one stage of the comparator circuit 30 with two OR gates 32 and 33 and one flip-flop circuit 27 of the storage device 26. To effect savings for the required components and the expense for connecting lines, the reference frequency counter 19 is sectioned, as described, into the interpreting counter section 17 and the releasing counter 18 because in such an arrangement the count of the interpreting counter section represents accurate information on the operating frequency received, if the releasing counter 18 has, at the same time, reached a defined count, at which a signal is produced releasing the interpretation.

The remote control receiver described makes use exclusively of components capable of being readily produced by integrated circuit technology. Therefore, it can be accommodated in an extremely small space. Also, it can be used reliably in applications where interference protection is an important factor.

It has been assumed in the above specification that the operating frequencies to be received and interpreted are in the supersonic range, but it presents no problem to apply the remote control receiver also to any other frequency ranges, provided an appropriately modified reference frequency is used.

What is claimed is:

1. A remote control receiver for the reception of command signals of different operating frequencies in individual channels, said receiver having a plurality of control outputs, each output assigned to an individual one of said channels, comprising operating frequency counter means for counting in each cycle of a repetitive sequence of counting cycles, received operating frequency command signals for production of an output signal upon the attainment of a predetermined count; reference frequency counter means controllable by the output signal of said operating frequency counter means for counting reference frequency signals in each said counting cycle of the operating frequency counter means; storage means for storing a reference frequency counter count reached in a said counting cycle; comparator circuit means for comparing after each counting cycle the reference frequency counter count with the count stored by said storage means and for producing, as a result of said comparison, a signal indicating agreement or non-agreement of said compared counts; and error register means for receiving and storing said signals produced by said comparator means to produce, upon the attainment of a predetermined number of consecutive agreements, an enabling signal for the generation of a control signal at the said control output assigned to the received operating frequency.

2. A remote control receiver according to claim 1, wherein said error register means includes an output for production of a further signal upon the attainment of a predetermined number of non-agreements of said compared counts; said storage means including an input connected to said output of the error register means; and transfer of said reference counter count into the storage device is effected by production of said further signal at the output of said error register means.

3. A remote control receiver according to claim 2, further including latch means connected to said error register means for response to said further output signal to disable said decoder means and to respond to said enabling signal to enable said decoder means.

4. A remote control receiver according to claim 2, wherein said error register means comprises a shift register having a plurality of flip-flop stages each providing direct and complementary outputs for producing signals indicating the state of that stage; first logic gating means having inputs connected to the respective complementary outputs of all said flip-flop stages for producing in response to the presence of inputs indicating that all said flip-flop stages are in a particular one of their two logic states, an enabling signal permitting generation of said control signal; a further logic gating means having a first input connected to the output of said operating frequency counter means and further inputs connected to the direct outputs of consecutive ones of at least some of said flip-flop stages for producing in response to presence of inputs indicating that one or more of said stages is in the other one of said two logic states, a signal enabling transfer of the count of the reference counter means into said storage means.

5. A remote control receiver according to claim 4, wherein the output of said first logic gating means is connected to a first switching input of a further latch circuit; the output of the further logic gating means being connected to another switching input of the further flip-flop circuit for controlling production or non-production by said further flip-flop circuit of an enabling signal for the generation of the control signal as a function of the signals applied to the switching inputs of said further flip-flop circuit.

6. A remote control receiver according to claim 1, including decoder means connected to said storage means for decoding the content of said storage device for the generation of said control signal at a decoder output as a function of the signals produced by said error register means.

7. A remote control receiver according to claim 1, wherein said reference frequency counter means includes a plurality of multistage, series connected shift register counters forming an auxiliary counter section, an interpreting counter section and a releasing counter section; said interpreting counter section having stage outputs connected to said comparator circuit means and to said storage means; said comparator circuit adapted to perform the comparison of consecutive interpreting counter section counts as a function of the application of an enabling signal; the releasing counter section having output connected to the comparator circuit input for providing said enabling signal thereto only after a predetermined number of counting cycles of the interpreting counter section.

8. Remote control receiver for the reception of command signals of different operating frequencies in individual channels; said receiver having a plurality of control outputs, each output assigned to an individual one of the channels; comprising operating frequency counter means for counting in each cycle of a repetitive sequence of counting cycles, operating frequency signals for production of an output signal upon the attainment of a predetermined count; reference frequency counter means controllable by the output signal of the operating frequency counter means for counting reference frequency signals in each said counting cycle of the operating frequency counter means; storage means for storing a reference frequency counter count reached in a said counting cycle; comparator circuit means for comparing after each counting cycle the reference frequency counter count with the count stored by said storage means and for producing as a result of said comparison a signal indicating agreement or non-agreement of said compared count; and error register means for receiving and storing signals produced by said comparison and to produce upon the attainment of a predetermined number of consecutive agreements an enabling signal for the generation of a control signal at the output assigned to the operating frequency received; said error register means including an output connected to an input of said storage means for transfer of said reference frequency counter count into said storage device upon storage by error register means of a predetermined number of consecutive non-agreements of said compared count; and latch means responsive to said error register output to disable said decoder means and responsive to said enabling signal to enable said decoder means.

* * * * *

UNITED STATES PATENT OFFICE
CERTIFICATE OF CORRECTION

Patent No. 4,052,700 Dated October 4, 1977

Inventor(s) Lembit Soobit and Horst Leuschner

It is certified that error appears in the above-identified patent and that said Letters Patent are hereby corrected as shown below:

On the Title Page, left column, change the Assignee information from "[73] Assignee: Texas Instruments Incorporated
Dallas, Texas"

to read -- [73] Assignee: Texas Instruments Deutschland G.m.b.H.
Freising, Germany. --

Signed and Sealed this

*Twenty-first* Day of *March 1978*

[SEAL]

*Attest:*

RUTH C. MASON
*Attesting Officer*

LUTRELLE F. PARKER
*Acting Commissioner of Patents and Trademarks*